(12) United States Patent
Robertson

(10) Patent No.: US 12,070,849 B2
(45) Date of Patent: Aug. 27, 2024

(54) TOOL ATTACHMENT, TOOL CHANGER AND CORRESPONDING METHOD OF USE

(71) Applicant: Saab Seaeye Limited, Fareham (GB)

(72) Inventor: Jon Mortimer Robertson, Fareham (GB)

(73) Assignee: SAAB SEAEYE LIMITED, Fareham (GB)

( * ) Notice: Subject to any disclaimer, the term of this patent is extended or adjusted under 35 U.S.C. 154(b) by 0 days.

(21) Appl. No.: 17/383,874

(22) Filed: Jul. 23, 2021

(65) Prior Publication Data
US 2022/0032476 A1 Feb. 3, 2022

(30) Foreign Application Priority Data
Jul. 30, 2020 (GB) .................................. 2011848

(51) Int. Cl.
*B25J 15/04* (2006.01)
*B23Q 5/04* (2006.01)
(Continued)

(52) U.S. Cl.
CPC .......... *B25J 15/0433* (2013.01); *B23Q 5/045* (2013.01); *B25J 15/0095* (2013.01);
(Continued)

(58) Field of Classification Search
CPC .. Y10T 409/309296; Y10T 409/30448; B23Q 5/045; B23Q 5/046; B25J 11/0055;
(Continued)

(56) References Cited

U.S. PATENT DOCUMENTS 3,247,978 A 4/1966 Neumeier
4,518,307 A 5/1985 Bloch
(Continued)

FOREIGN PATENT DOCUMENTS

CN 104816046 A * 8/2015
DE 9420589 U1 * 4/1995
(Continued)

OTHER PUBLICATIONS

Machine Translation of CN 104816046 A, which CN '046 was published Aug. 2015.*
(Continued)

*Primary Examiner* — Erica E Cadugan
(74) *Attorney, Agent, or Firm* — FREDRIKSON & BYRON, P.A.

(57) ABSTRACT

A tool attachment (200) for a robotic manipulator (100), includes a housing (202), an input shaft (208) configured to be engaged by an end effector (105) of the robotic manipulator (100), an output shaft (210), and a tool (214) coupled to the output shaft (210). The housing (202) includes at least one slot or at least one projection for preventing relative rotational movement between the housing (202) and a housing of the robotic manipulator (100). Upon engagement of the end effector (105) of the robotic manipulator (100) with the input shaft (208), the tool attachment (200) is retained on the robotic manipulator (100), and rotational movement of the end effector (105) of the robotic manipulator (100) acts to rotate said input shaft (208) and drive said tool (214).

19 Claims, 8 Drawing Sheets

(51) Int. Cl.
  *B25J 15/00* (2006.01)
  *B25J 15/08* (2006.01)
(52) U.S. Cl.
  CPC ........ *B25J 15/0491* (2013.01); *Y10S 483/901* (2013.01); *Y10T 409/309296* (2015.01)
(58) Field of Classification Search
  CPC .............. B25J 15/0458; B25J 15/0491; Y10S 483/901
  USPC .................................. 409/230, 144; 483/901
  See application file for complete search history.

(56) References Cited

U.S. PATENT DOCUMENTS

| | | | |
|---|---|---|---|
| 4,624,043 A | 11/1986 | Bennett | |
| 4,693,663 A | 9/1987 | Brenholt et al. | |
| 4,709,455 A * | 12/1987 | D'Andrea | B23B 39/205 409/199 |
| 4,897,014 A | 1/1990 | Tietze | |
| 5,118,248 A | 6/1992 | Eberhard | |
| 5,460,536 A | 10/1995 | Cullen | |
| 5,697,739 A * | 12/1997 | Lewis | B23Q 11/1023 409/230 |
| 2006/0235436 A1 | 10/2006 | Anderson et al. | |
| 2008/0284117 A1* | 11/2008 | Tanaka | B23B 41/02 279/137 |
| 2009/0035081 A1* | 2/2009 | Foletti | B23Q 5/045 408/113 |
| 2011/0268520 A1* | 11/2011 | Usuda | B23Q 5/045 409/230 |
| 2014/0220871 A1* | 8/2014 | Kosonen | B24B 41/002 451/311 |
| 2016/0199138 A1 | 7/2016 | Cooper et al. | |
| 2016/0263717 A1 | 9/2016 | Garnham et al. | |
| 2017/0095937 A1 | 4/2017 | Williams | |
| 2018/0168752 A1 | 6/2018 | Scheib et al. | |

FOREIGN PATENT DOCUMENTS

| | | | |
|---|---|---|---|
| EP | 1281462 A1 * | 2/2003 | |
| GB | 2120634 A | 12/1983 | |
| JP | 60-048257 A * | 3/1985 | |
| JP | 2000-141129 A * | 5/2000 | |
| KR | 101786752 B | 10/2017 | |
| WO | 2019027228 A1 | 2/2019 | |
| WO | 2019096939 A1 | 5/2019 | |

OTHER PUBLICATIONS

Merriam-Webster's Collegiate Dictionary, 10th ed., copyright 1998, p. 1013.*

Search Report dated Jan. 11, 2021 for related British Application No. GB 2011848.5, 1 pg.

* cited by examiner

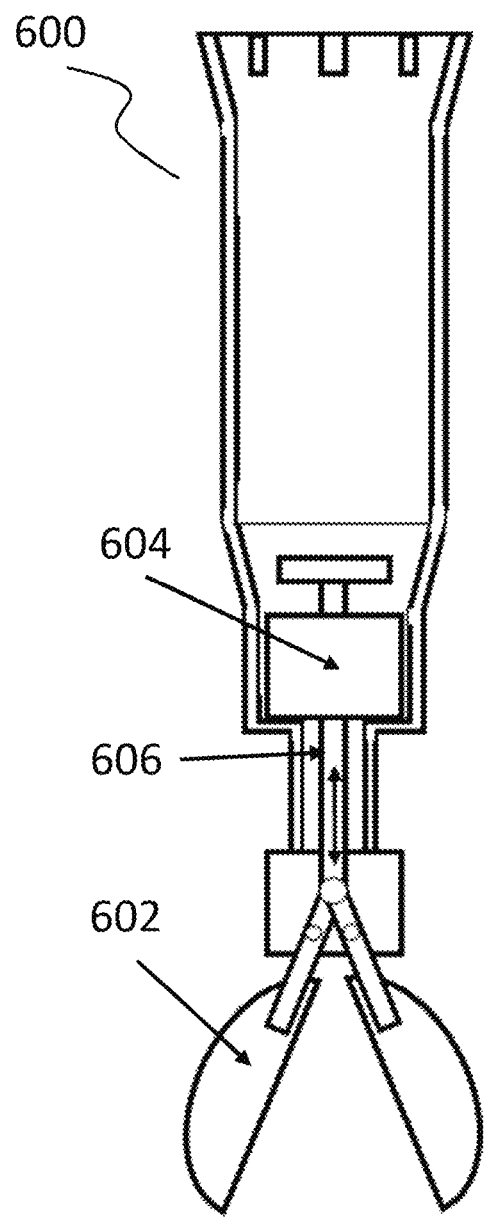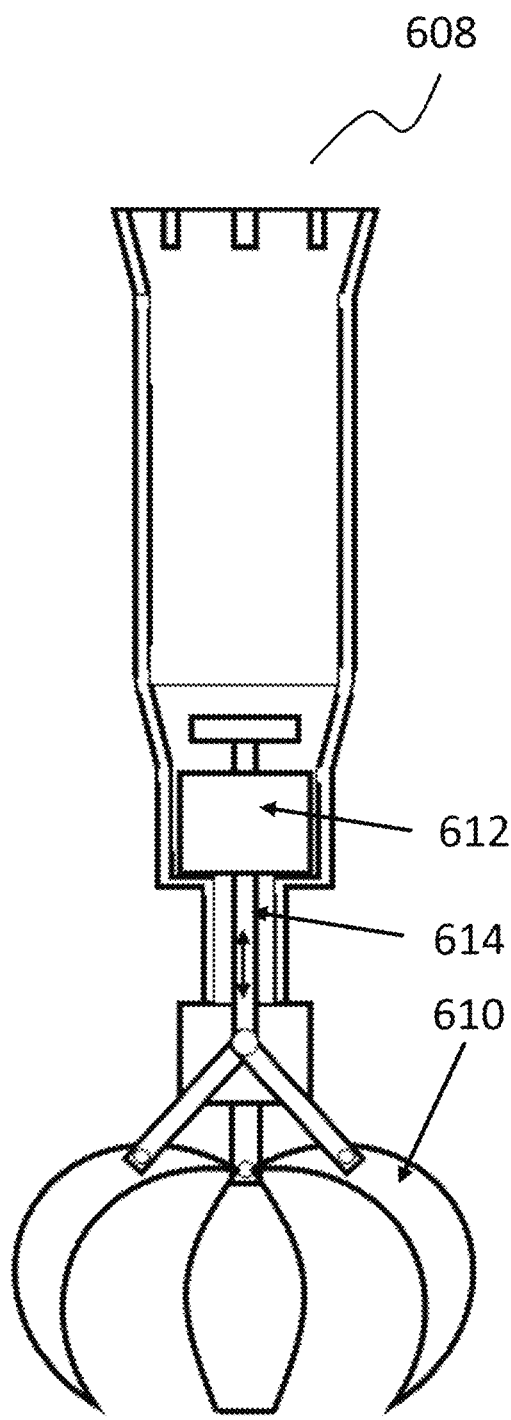
Figure 6(a)
Figure 6(b)

Alternative Arrangement for the Means For Preventing Relative Rotation Between the Housing of the Tool Attachment and the Housing of the Robotic Manipulator, In Which the Means For Preventing Relative Rotation Comprises at Least One Projection on the Housing of the Tool Attachment Configured to engage with A/Each Corresponding Slot on the Robotic Manipulator

Figure 8

TOOL ATTACHMENT, TOOL CHANGER AND CORRESPONDING METHOD OF USE

RELATED APPLICATIONS

This application claims priority to British Application No. 2011848.5, filed Jul. 30, 2020, the contents of which are herein incorporated by reference.

FIELD OF THE INVENTION

The present invention relates to a tool attachment for a robotic manipulator. In particular, one or more embodiments relate to a tool attachment having a tool, wherein the tool attachment is to be engaged by an end effector of the robotic manipulator and the tool is driven by rotational movement of the end effector. The present invention further relates to a tool changer comprising a plurality of tool attachments, and a method of use of the tool changer.

BACKGROUND

A manipulator is a type of robot which is able to replicate certain human movements and functions. In particular, a manipulator can be used to manipulate objects without requiring an operator to have direct physical contact with the object. Consequently, manipulators are typically used to perform tasks which are repetitive, too difficult, or too dangerous for a human to perform. A manipulator can take the form of a robotic arm which is designed to broadly mimic the functionality and dexterity of a human arm. Hydraulic, pneumatic or electromechanical actuators can be used to move the different parts of the manipulator and the manipulator may consist of multiple articulated joints to allow the desired degrees of freedom.

A manipulator comprises an end effector, which is designed to interact with the environment. An end effector is generally the final module of the manipulator and typically comprises some form of tool for interacting with or manipulating objects in the surrounding environment. There are a number of different types of end effectors and end effectors are often interchangeable, so that a single robotic manipulator may perform a variety of functions by using a different end effector.

A known end effector for a manipulator is a gripper. A gripper generally consists of two or more fingers, prongs, or jaws which are actuated to open and close the fingers, prongs, or jaws with either a parallel or radial motion. Many grippers also have a rotatable wrist which allows the gripper to rotate about the longitudinal axis of the robotic arm. The purpose of the gripper is to engage various objects and allow the robotic manipulator to grip and apply sufficient force to secure and manipulate the object's position.

However, these known end effectors present a number of problems. Each end effector is typically designed for a single function, such as gripping, removal of material (e.g. cutting, drilling, or deburring), welding, or sensing. When the robotic manipulator is to carry out a different function, the end effector must be replaced. This is a complex, time-consuming, and costly process, which typically requires trained human personnel.

Additionally, as each end effector as well as the connection between the manipulator and the end effector are highly complex and manufacturing tolerances are low, end effectors are expensive to manufacture.

Some prior art manipulators are known which have adapters configured for attachment to an end effector, such as that described in WO 2019/096939. However, these adapters are typically configured for attachment to a single specific end effector, and are attached to a linkage of the robotic manipulator to add further joints and associated linkages to the robotic arm. Each of these further joints increases the number of degrees of the robotic arm, thereby improving its functionality. Each joint requires individual motors or actuators to increase the number of degrees of freedom of the robotic arm.

However, changing the end effector remains complex and time-consuming, as it may require changing or removal of the adapter.

Further, a common application for robotic manipulators are unmanned underwater vehicles (UUVs), which include remotely operated underwater vehicles (ROVs) and autonomous underwater vehicles (AUVs). However, as changing end effectors is complex, a UUV is often capable of performing only a single function with its robotic manipulator (the function associated with the end effector connected to the robotic manipulator) before having to return to a surface vehicle from which it was launched.

BRIEF SUMMARIES OF OBJECTS OF THE INVENTION

*The inventors have appreciated the need for a tool attachment for a robotic manipulator, which allows for the function of the robotic manipulator to be changed autonomously and quickly without a need to change the end effector.

The inventors have further appreciated the need for a tool changer capable of holding a plurality of tool attachments and making them selectively accessible for attachment to the robotic manipulator.

In a first aspect, the invention provides a tool attachment for a robotic manipulator, comprising: a housing configured to engage with a robotic manipulator; an input shaft configured to be engaged by an end effector of the robotic manipulator; an output shaft coupled to the input shaft; and a tool coupled to said output shaft. The housing comprises means for preventing relative rotational movement between said housing and a housing of the robotic manipulator. Upon engagement of the end effector of the robotic manipulator with the input shaft, the tool attachment is retained on the robotic manipulator, and rotational movement of the end effector of the robotic manipulator acts to rotate said input shaft and drive said tool.

The tool attachment of the present invention allows for rapid and remote replacement of a tool attachment of a robotic manipulator, without needing an end effector of the robotic manipulator to be replaced. As the robotic manipulator can easily engage the input shaft of the tool attachment via its end effector to drive the tool, and the housing of the tool attachment prevents relative rotational movement between the housing of the tool attachment and a housing of the robotic manipulator, the tool attachment allows for increased functionality of a robotic manipulator as well as faster and remote changing of a tool.

In contrast to prior art adapters, such as that of WO 2019/096939, the present invention provides an easily engageable gauntlet with an input shaft for engagement by the robotic manipulator for torque transfer, such that rotational movement of the end effector of the robotic manipulator acts directly to rotate the input shaft of the tool attachment or gauntlet and thereby drive the tool. The adapter of WO 2019/096939 is merely attachable to a linkage of the robotic arm, and does not allow for the same adaptability and increased functionality and autonomy of a robotic manipulator as the tool attachment of the present invention.

As the housing of the tool attachment comprises means for preventing relative rotational movement between the housing of the tool attachment and a housing of the robotic manipulator, the tool attachment can be engaged, and disengaged, by an end effector of a robotic arm which is controlled remotely by the user. Therefore, this task can be conducted while the robotic manipulator is on mission, for example, attached to a UUV many hundreds of metres below sea-level, without requiring direct physical input by the user.

Preferably, said housing comprises a hollow sleeve portion having a first, open, end, and a second, closed, end, said tool disposed at said second end. Advantageously, this allows for the robotic manipulator to enter the hollow sleeve portion via the first, open, end to drive the tool at the second end without direct contact with the tool.

The first end, more preferably, comprises a guide portion configured to radially align and guide the robotic manipulator into said housing. This allows the robotic manipulator to easily enter said housing without requiring the robotic manipulator to be aligned, and results in more reliable engagement of the input shaft by the end effector.

The term "radial" is used herein to describe a direction along the radius of the tool attachment, that is, perpendicular to a longitudinal axis of the tool attachment.

Yet more preferably, said guide portion is frusto-conical. A robotic manipulator will thus be guided into the housing by the funneling effect of the frusto-conical shape.

A rotational axis of said input shaft, in preferred embodiments, is substantially aligned with a longitudinal axis of said housing. As such, the rotational motion of the robotic manipulator is transferred onto the input shaft without any angular moment.

Said means for preventing relative rotational movement preferably comprises at least one slot, or at least one projection, configured to engage with a corresponding projection, or slot, on the robotic manipulator. Advantageously, such a slot and projection system is simple, and it is reliable because it is unlikely to suffer from wear-and-tear.

Alternatively, the means for preventing relative rotational movement may comprise a female threaded portion provided on the inner surface of the housing, and configured to engage with a male threaded portion provided on the robotic manipulator. In this alternative, the threaded portions may be configured to engage upon rotation in a direction opposite to the drive direction of the input shaft, or in a direction matching the drive direction of the input shaft in dependence on whether the input shaft and the output shaft rotate in the same or in opposite directions. In this way, the tool attachment maintains engagement with the robotic manipulator during use. To effect the engagement of the threads the end effector may be opened when inside the gauntlet housing to engage with an internal groove feature. The end effector may then be rotated to rotate the housing and thereby screw it onto the arm. The end effector can then engage with the input shaft and rotate to drive the tool.

A further alternative means for preventing relative rotational movement may comprise a bayonet fitting.

Additionally, such a system may, in some embodiments, be coded, such that a specific tool attachment is engageable only by a specific robotic manipulator. This may prevent accidental damage to either the robotic manipulator or the tool attachment, in particular if e.g. a UUV comprises a plurality of different robotic manipulators.

In preferred embodiments, said input shaft comprises an interface portion configured to be engaged by the effector of the robotic manipulator. In more preferred embodiments, said interface portion comprises a bar affixed perpendicular to said input shaft to form a T-piece. This allows for easy and reliable engagement and disengagement of the end effector of the robotic manipulator with the interface portion. Additionally, a T-piece is easy to manufacture and structurally resilient.

In some embodiments, the tool is a rotary tool, and the output shaft is coupled to the input shaft by a transmission unit comprising an input coupled to the input shaft and an output coupled to the output shaft, said transmission unit configured such that the rotational speed of the output is higher than the rotational speed of the input, or such that the rotational speed of the output is lower than the rotational speed of the input. This allows for the rotary tool to be driven at an appropriate rotational speed without requiring modification of the rotational speed of the end effector of the robotic manipulator. The transmission unit preferably comprises an epicyclic, planetary, gearbox. Alternative the transmission unit may comprise a gear train. Advantageously, this allows for a robotic manipulator to drive a large variety of tools without modification, thereby increasing functionality.

A rotational axis of the transmission unit output may be angularly offset from a rotational axis of the transmission unit input. Advantageously, this allows for increased functionality of the robotic manipulator as the rotation of the end effector cannot only be transferred coaxially to that of the input shaft, but angularly offset. Therefore, a wider variety of tools may be attached to, and used by, the robotic manipulator owing to the tool attachment without requiring changes to the robotic manipulator. Preferably, the offset is about 90 degrees. Where the rotational axis of the transmission unit output is angularly offset from a rotational axis of the transmission unit input, the transmission unit is preferably a bevel gearbox, more preferably a 90 degree bevel gearbox.

The tool attachment may comprise a first transmission unit, configured such that the rotational speed of the output is higher than the rotational speed of the input, or such that the rotational speed of the output is lower than the rotational speed of the input, and a second transmission unit, configured such that a rotational axis of the second transmission unit output is angularly offset from a rotational axis of the transmission unit input.

The rotary tool may be one of: a brush; a cutting disc; a grinding disc; and a drill.

In other embodiments, the tool is a linear tool, and the output shaft is coupled to the input shaft by a linear transmission unit comprising an input coupled to the input shaft and an output coupled to the output shaft, said transmission unit configured such that rotation input shaft causes linear movement of the output shaft. In this way, the tool attachment enables the robotic manipulator to drive a linear tool without having to change the end effector, thereby allowing increased functionality without the requirement of complex and time-consuming replacement of the end effector. The linear tool may be one of: a cable cutter; a gripper comprising three or more jaws; an "orange peel" grabber; and a sample collector.

In a second aspect, the invention provides a tool changer comprising a plurality of tool attachments for a robotic manipulator as described above, each said tool attachment comprising a different tool; and a tooling basket comprising a plurality of mounts, each mount configured to releasably mount a respective one of the plurality of tool attachments.

The tool changer allows for convenient storage, release, and changing of a plurality of tool attachments. The function of a robotic manipulator can thus be easily and remotely changed—each tool attachment comprises a different tool and can be "equipped" by the robotic manipulator without having to replace an end effector of the robotic manipulator. The tools of the tool attachments may be rotary or linear tools, further increasing the functionality of the robotic manipulator.

The tooling basket is preferably configured to be mounted to an unmanned underwater vehicle. Thus, the UUV may perform a plurality of functions without having to return to a surface vehicle from which it was launched.

The tooling basket may comprise a rotatably mounted carousel configured to selectively rotate said plurality of tool attachments to a position in which a tool attachment can be engaged by a robotic manipulator. As such, the tool attachment may easily be replaced with another tool attachment without the robotic manipulator having to seek out the other tool attachment—the robotic manipulator may place a first tool attachment on a first mount, the carousel may be rotated, and the robotic manipulator may engage with a second tool attachment on a second mount which has been rotated to be in the same position as the first mount before the rotation.

In preferred embodiments, the tool changer further comprises a robotic manipulator portion comprising an end effector, wherein, a housing of said robotic manipulator portion comprises corresponding means for preventing relative rotational movement between said housing of the robotic manipulator and said housing of the tool attachment.

In more preferred embodiments, the housing of the tool attachment comprises at least one slot, or at least one projection, and said housing of the robotic manipulator comprises at least one corresponding projection, or at least one corresponding slot, on the robotic manipulator. The at least one slot or at least one projection are, in yet more preferred embodiments, keyed to said corresponding at least one projection, or at least one slot, such that the robotic manipulator is rotationally aligned to said tool attachment.

In the most preferred embodiments, the end effector is a gripper.

In a third aspect, the invention provides a method of use of a tool changer comprising a plurality of tool attachments for a robotic manipulator, the method comprising the steps of: engaging an input shaft of a first tool attachment of the plurality of tool attachments with an end effector of the robotic manipulator; dismounting the first tool attachment from a first mount of the tool changer; and remounting the first tool attachment onto the first mount of the tool changer.

Preferably, the method further comprises the step of performing an action with the first tool attachment. More preferably, the method further comprising the step of dismounting a second tool attachment from a second mount of the tool changer. Yet more preferably, the method further comprises the step of rotating, selectively, a carousel of the tool changer, to position a specific one of the plurality of tool attachments so as to be engageable by the end effector of the robotic manipulator. Any feature in one aspect of the invention may be applied to other aspects of the invention, in any appropriate combination. In particular, method aspects may be applied to apparatus aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

BRIEF DESCRIPTIONS OF THE DRAWINGS

The invention will now be further described with reference to the figures in which:

FIGS. 6a and 6b show further examples of tools suitable for the tool attachment.

FIG. 8 schematically depicts an alternative arrangement for the means for preventing relative rotation between the housing of the tool attachment and the housing of the robotic manipulator.

DETAILED DESCRIPTION OF EMBODIMENTS OF THE INVENTION

Figure 1:
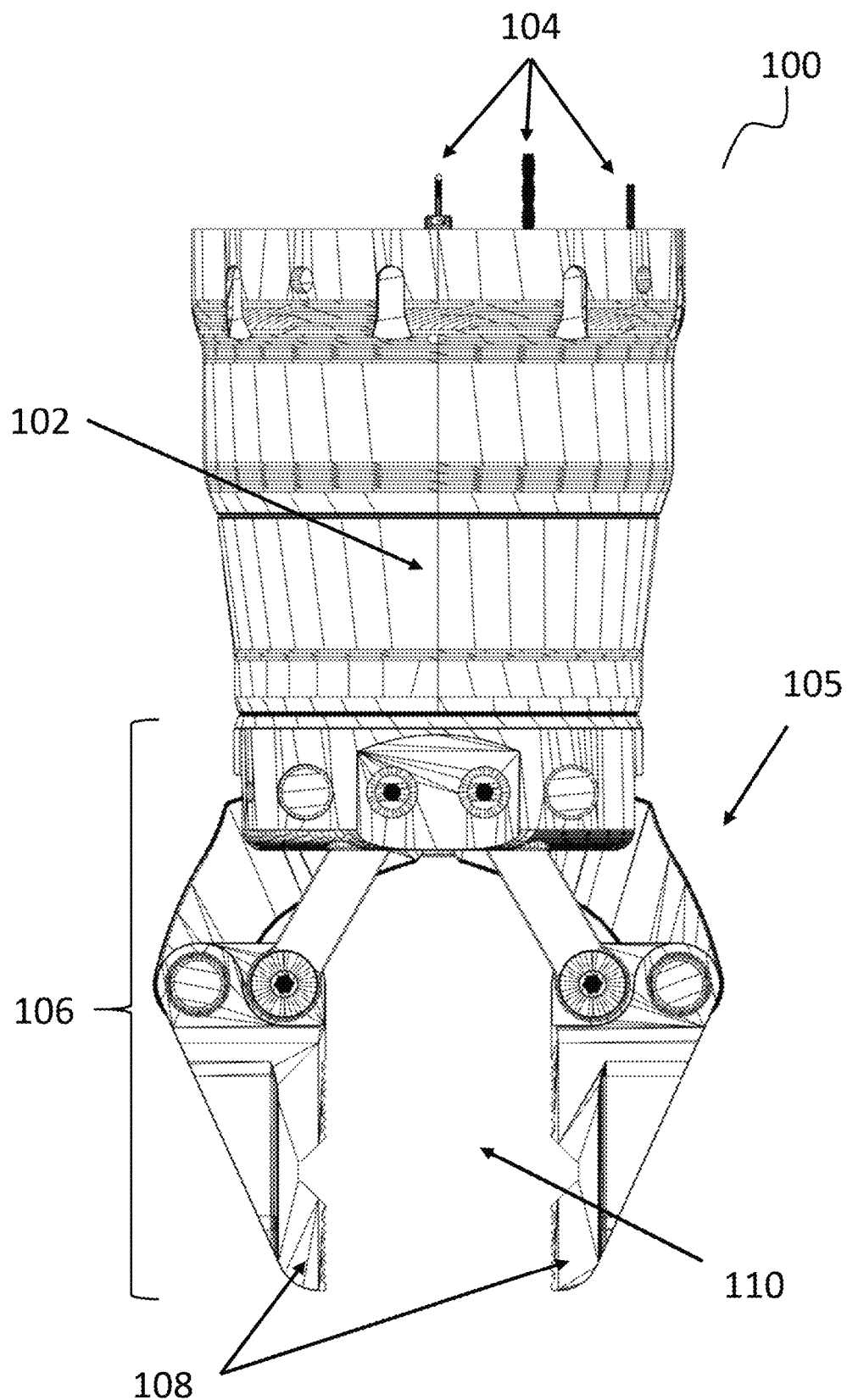
FIG. 1 is a side view of an exemplary robotic manipulator.

FIG. 1 is a side view a distal end of an exemplary robotic manipulator 100, which comprises a housing 102, and which comprises plurality of connectors 104, such as wires, configured to be connected to the remaining portions of the robotic manipulator (not shown).

The terms "distal" and "proximal" are used herein to describe the relative positions of components of the robotic manipulator 100 and the tool attachment 200. An exemplary robotic manipulator 100, or a tool attachment 200 according to the present invention, has a proximal end which is closest to a robotic manipulator and a distal end which is furthest from a robotic manipulator.

The robotic manipulator 100 terminates distally in an end effector 105. The end effector 105 is a gripper module 106 having two prongs or fingers 108. The gripper module 106 is configured to allow each of the prongs or fingers 108 to be actuated to close a gap 110 between the prongs or fingers 108 to grip, or engage, objects external to the robotic manipulator 100. The gripper module 106 is also configured to rotate, powered by a drive motor, about a longitudinal axis of the robotic manipulator.

Figure 2:
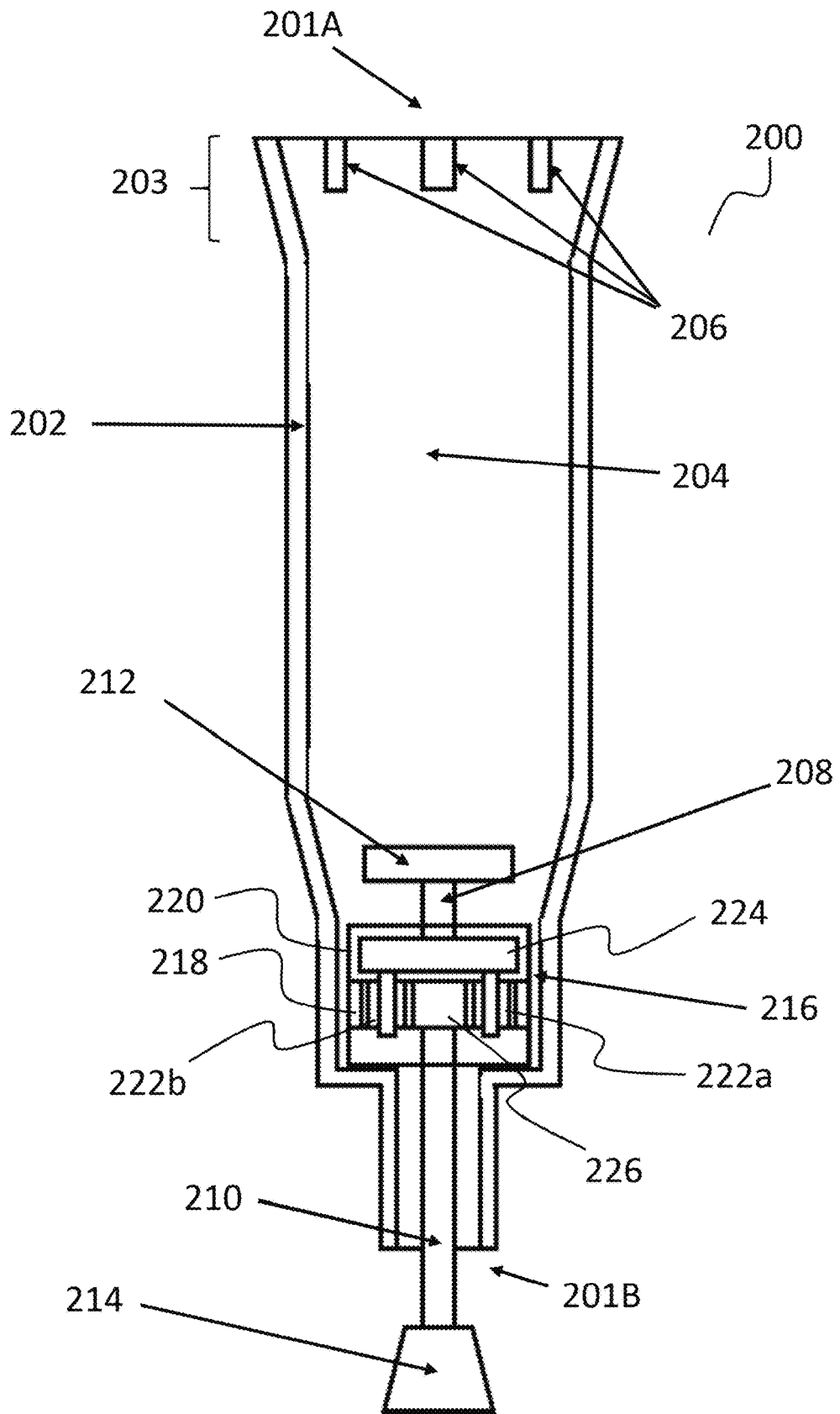
FIG. 2 is a schematic cross-section of a tool attachment according to the present invention.
Figures 3A, 3B:
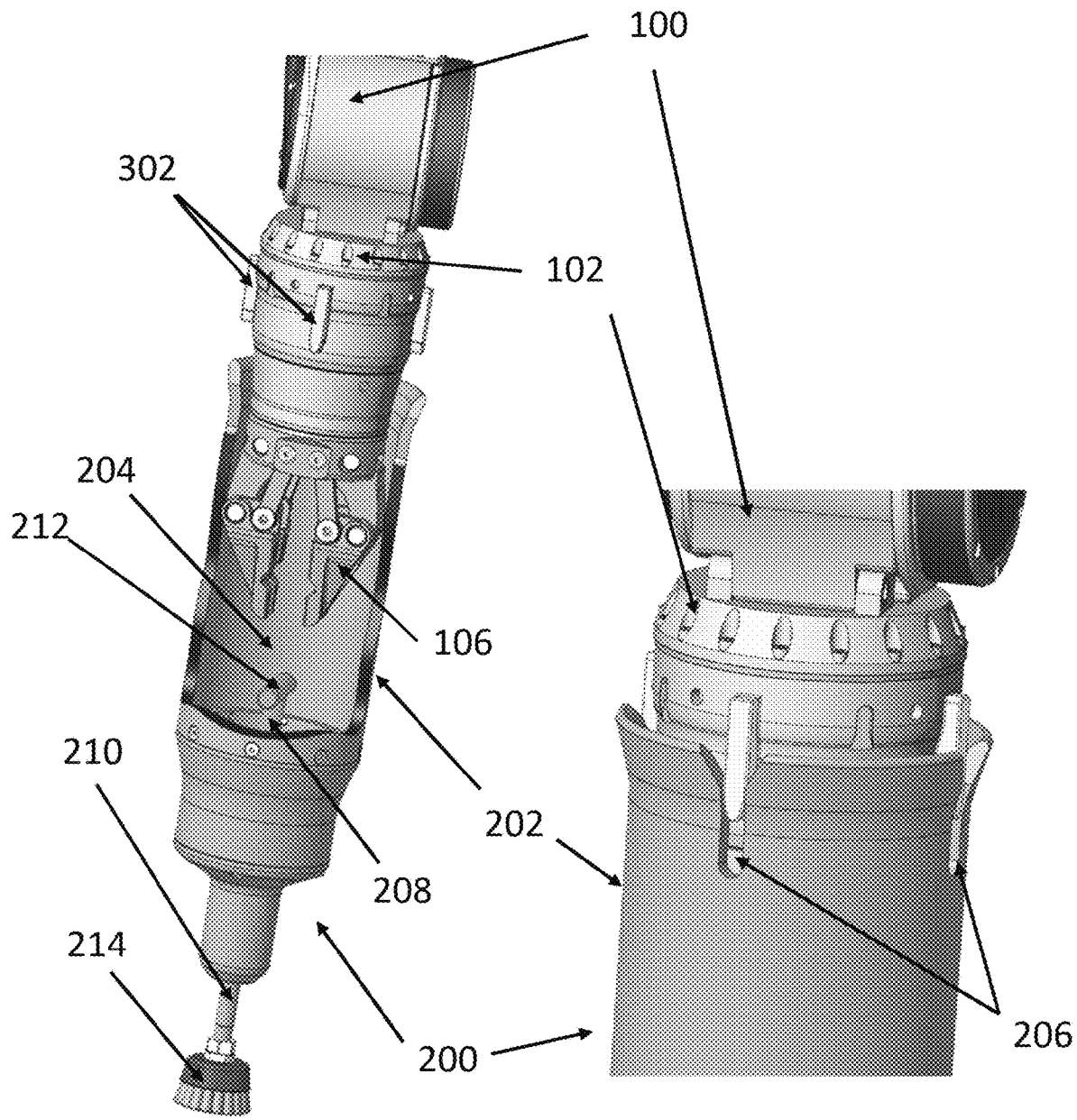
FIG. 3A is a cut-away perspective view of the tool attachment of FIG. 2 without part of its housing, and the exemplary end effector of FIG. 1 connected to a robotic manipulator.
FIG. 3B is a close-up perspective view of a connection between the housing of the tool attachment of FIG. 2 and the exemplary end effector of FIG. 1.

As shown in FIGS. 2, 3A, and 3B, a tool attachment 200 according to the present invention comprises a housing 202 having a proximal end 201A which is open, shown at the top of FIG. 2, and a distal end 201B which is closed, shown at the bottom of FIG. 2. The proximal end 201A of the housing 202 comprises a guide portion 203, which is frusto-conical. The housing 202 is a hollow sleeve which defines a cavity 204 configured to receive a robotic manipulator 100 and a portion of a robotic manipulator.

As the distal portion of the robotic manipulator 100 comprising the gripper module 106 enters the cavity 204 to engage the tool attachment 200, the guide portion 203 is configured to guide the distal portion of the robotic manipulator 100 into the cavity 204 as well as radially aligning the robotic manipulator 100 with the housing 202.

At its proximal end 201A, the housing 202 further comprises a plurality of slots 206 configured to engage with corresponding projections on a housing 102 of the robotic manipulator 100. As such, the slots-and-projections prevent relative rotational between the housing 202 of the tool attachment 200 and the housing 102 of the robotic manipulator 100. That is to say, the slots and projections transfer the torque generated when the end effector, i.e. the gripper module 106, rotates to power the tool 214.

Only some of the slots 206 are shown in FIGS. 2, 3A, and 3B. In some embodiments, there are three slots, or four slots, and the slots are spaced evenly around the circumference of the housing, such that the torque that must be resisted by the slots-and-projections to prevent the relative rotational motion of the housings 102, 202 to one another can be evenly distributed around the circumference.

The gripper module 106 is configured to engage an input shaft 208 of the tool attachment 200. The gripper module 106 is attached to the robotic manipulator 100.

The housing 102 of the robotic manipulator 100 comprises a plurality of projections 302 which correspond to the plurality of slots 206 in the housing 202 of the tool attachment 200.

The input shaft 208 is coupled to an output shaft 210. When the input shaft 208 is engaged by the gripper module 106 of the robotic manipulator 100, rotational movement of the gripper module 106 acts to rotate the input shaft 208, and said rotation of the input shaft 208 drives the output shaft 210.

The input shaft 208 is substantially co-axial with the longitudinal axis of the housing 202, such that the rotational axis of the input shaft 208 is aligned with the longitudinal axis of the housing 202, so that there is substantially no angular moment between the robotic manipulator 100 and the input shaft 208.

Proximally, the input shaft 208 comprises an interface portion, configured to be engaged by the robotic manipulator 100, which is a bar 212 affixed perpendicular to said input shaft 208. The input shaft 208 and the bar 212 form a T-piece which facilitates engagement of the input shaft 208 by the robotic manipulator 100.

At the distal end 201B, the tool attachment 200 comprises the tool 214. In the embodiment shown in FIG. 2, the tool 214 is a rotary brush. As the tool 214 is a rotary tool, the output shaft 210 is coupled to the input shaft 208 by a transmission unit 216 or gear box. The transmission unit 216 allows for the rotational speed of the output shaft 210 to be different to that of the input shaft 208—in this example the transmission unit is an epicyclic, planetary, gearbox comprising a ring gear 218 fixed to the housing 220 of the transmission unit 216, a series of planet gears 222a, 222b, . . . , fixed to a planet carrier 224, and a sun gear 226. In this example, the planet carrier 224 is coupled to the input shaft 208, and the sun gear 226 is coupled to the output shaft 210, and so the rotational speed of the output shaft will be greater than the rotational speed of the input shaft. As will be appreciated, if it is required that the rotational speed of the output shaft is less than the rotational speed of the input shaft then the transmission unit may be arranged such that the input shaft is coupled to the sun gear and the output shaft is coupled to the planer carrier.

As shown in the cut-away perspective view of the tool attachment 200 in FIG. 3A, the gripper module 106 is configured to enter the cavity 204 defined by housing 202 to engage the input shaft 208 via the bar 212.

Figure 4:
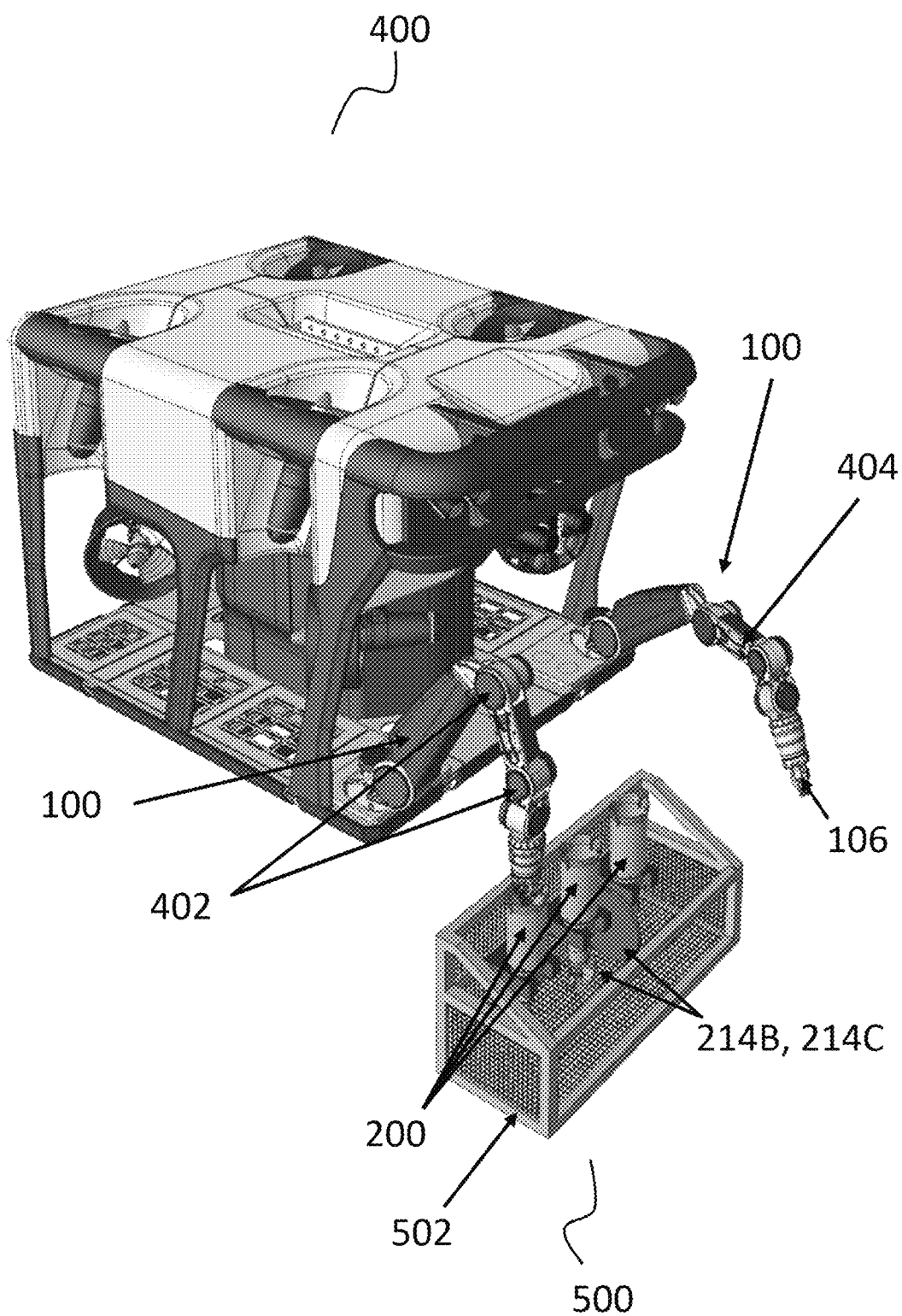
FIG. 4 is a perspective view of an exemplary unmanned underwater vehicle and a tool changer according to the present invention.
Figure 5:
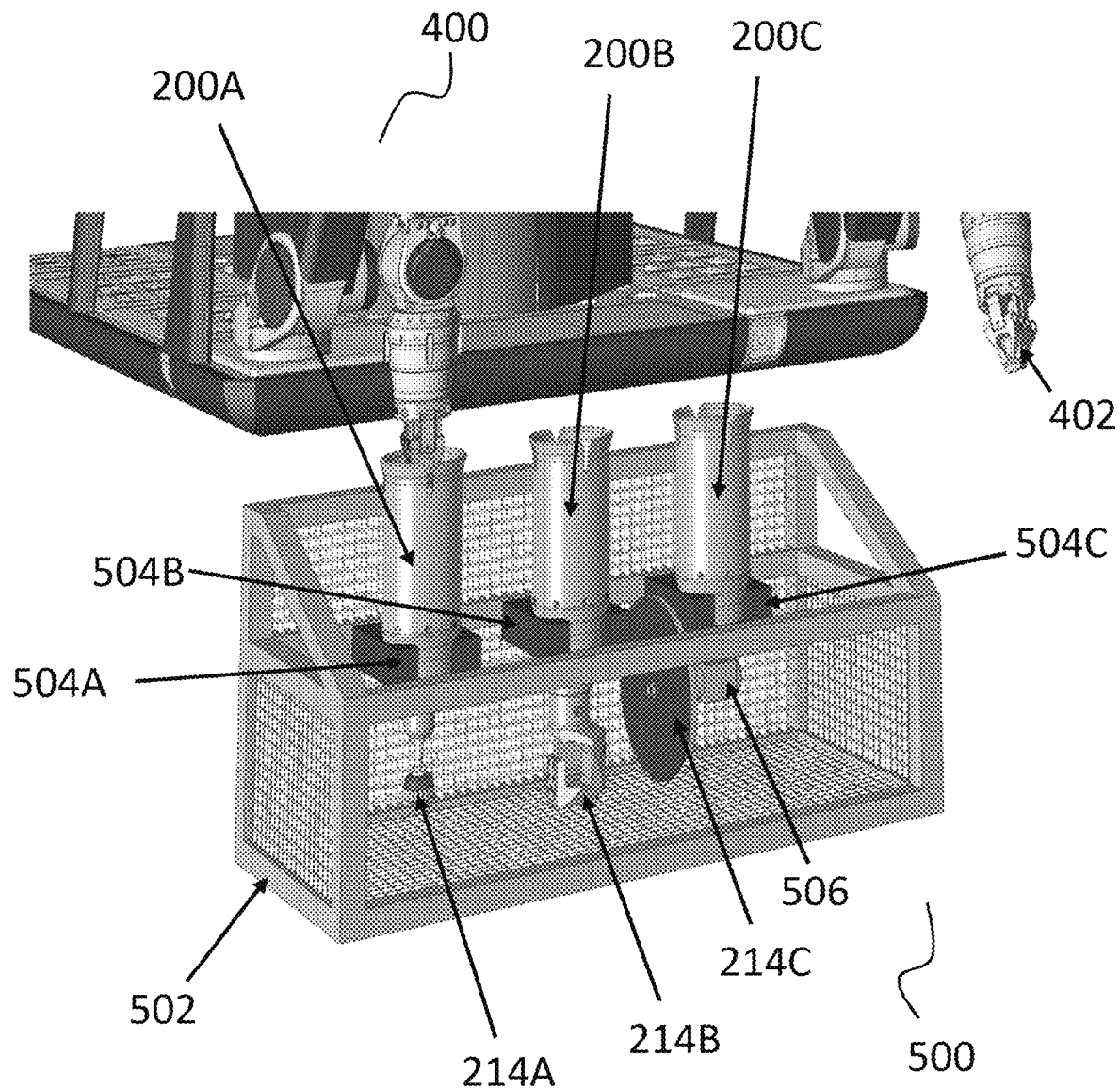
FIG. 5 shows an enlarged perspective view of the tool changer of FIG. 4 and a portion of the exemplary unmanned underwater vehicle.

FIGS. 4 and 5 show a UUV 400 comprising two robotic manipulators 100, each robotic manipulator 100 comprising a gripper module 106 as end effector 105. The robotic manipulators 100 comprise joints 402 and linkages 404.

Also shown is a tool changer 500 according to the present invention. The tool changer 500 comprises a plurality of tool attachments 200. Each tool attachment 200 comprises a different tool 214A, 214B, 214C.

The tool changer 500 is defined by a tooling basket 502 comprising a plurality of mounts 504A, 504B, 504C. Each mount 504A, 504B, 504C is configured to receive one of the tool attachments 200.

Each tool attachment 200 is releasably mounted on a respective one of the mounts 504A, 504B, 504C. Although not shown, the tooling basket 502 may be mounted to the UUV 400 by a fastening means, such as bolts or wires. Alternatively, the tooling basket 502 may be mounted to the UUV 400 by quick release pins. The quick release pins may be remotely actuatable to enable the UUV to dock and undock with the tooling basket while subsea. In this alternative, the tooling basket 502 may remain, for example, on the seafloor while the UUV carries out the mission.

A first tool attachment 200A is mounted on a first mount 504A, and comprises a rotary tool such as the rotary brush 214A also shown in FIGS. 2 and 2A. Although the rotational speed of the rotary brush 214A may differ from a rotational speed of the robotic manipulator 100 due to the transmission unit 216, the rotational axis of the rotary brush 214A is coaxial to the rotational axis of the robotic manipulator 100.

A second tool attachment 200B is mounted on a second mount 504B, and comprises a linear tool such as a cable cutter 214B. The second tool attachment 200B therefore comprises a linear transmission unit which is configured to convert rotational movement of the input shaft 208 into linear movement of the output shaft 210.

The conversion of rotary motion to linear motion may be achieved by any means known to the skilled person, such as a screw type mechanism, rack and pinion mechanisms, slider-crank mechanisms, or the like. The screw type mechanism may be a lead screw, ball screw or satellite roller screw, mechanism.

A third tool attachment 200C is mounted on a third mount 504C, and comprises a rotary tool such as a cutting disc or grinding disc 214C, the rotational motion of which is angularly offset from a rotational axis of the input shaft 208. The angular transmission unit 506 of the third tool attachment 200C allows for rotational movement of the input shaft 208 to be angularly offset, such that rotational motion of the output shaft 210 occurs along a different rotational axis than rotational motion of the input shaft 208. The rotational axis of the cutting disc or grinding disc 214C is offset by about 90 degrees from the rotational axis of the input shaft 208.

Although the tool changer 500 is shown as having three tools 214A, 214B, 214C attached to three tool attachments 200A, 200B, 200B mounted on three mounts 504A, 504B, 504C, the tool changer 500 may comprise any number of tools. Tools with further functionality may be easily envisaged by the skilled person.

Any variety of linear tools may be envisaged be the skilled person, and although the cable cutter 214B is configured to move linearly in a direction of the rotational axis of the input shaft 208, the linear tool may move in a direction which is angularly offset from the rotational axis of the input shaft 208.

Similarly, any variety of angular tools may be envisaged, and rotational movement of such an angular tool may be along the rotational axis of the input shaft 208, or it may be angularly offset from the rotational axis of the input shaft 208. Additionally or alternatively, the rotational speed of the output shaft 210 may be different to the rotational speed of the input shaft 208, and the rotational speed of the output shaft 210 may be variable dependently or independently of the speed of the input shaft 208.

FIGS. 6(a) and 6(b) respectively show two examples of further linear actuated tools. In each example, the housing of the tool attachment device and the input to the transmission unit is that same as for the example shown and described with reference to FIG. 2. Looking first to FIG. 6(a), the tool attachment device 600 comprises a subsea sample collector tool 602. The tool comprises a pair of matching scoops, in the form of concave cups, configured to open and close upon linear actuation of the tool. The transmission unit 604 is configured to convert the rotational input to linear motion of the output shaft 606 which in turn acts on the lever arms of the tool 602.

Looking now to FIG. 6(b), the tool attachment device 608 comprises an "orange peel" grabber tool 610. The "orange peel" grabber tool 610 comprises a plurality of concave sections which, upon the grabber being closed, form an enclosed space in which material may be held. Similarly to the tool attachment 600, the tool attachment 608 further comprises transmission unit 612 which is configured to convert the rotational input to linear motion of the output shaft 614 which in turn acts on the lever arms of the tool 610.

As the reach of the robotic manipulators 100 attached to the UUV 400 may be limited, the tooling basket 502 of the tool changer 500 may comprise a carousel which is rotatable such that a selected one of the three tool attachments 200A, 200B, 200C is in a position to be engaged by the gripper module 106 of the robotic manipulator 100.

Figure 7:
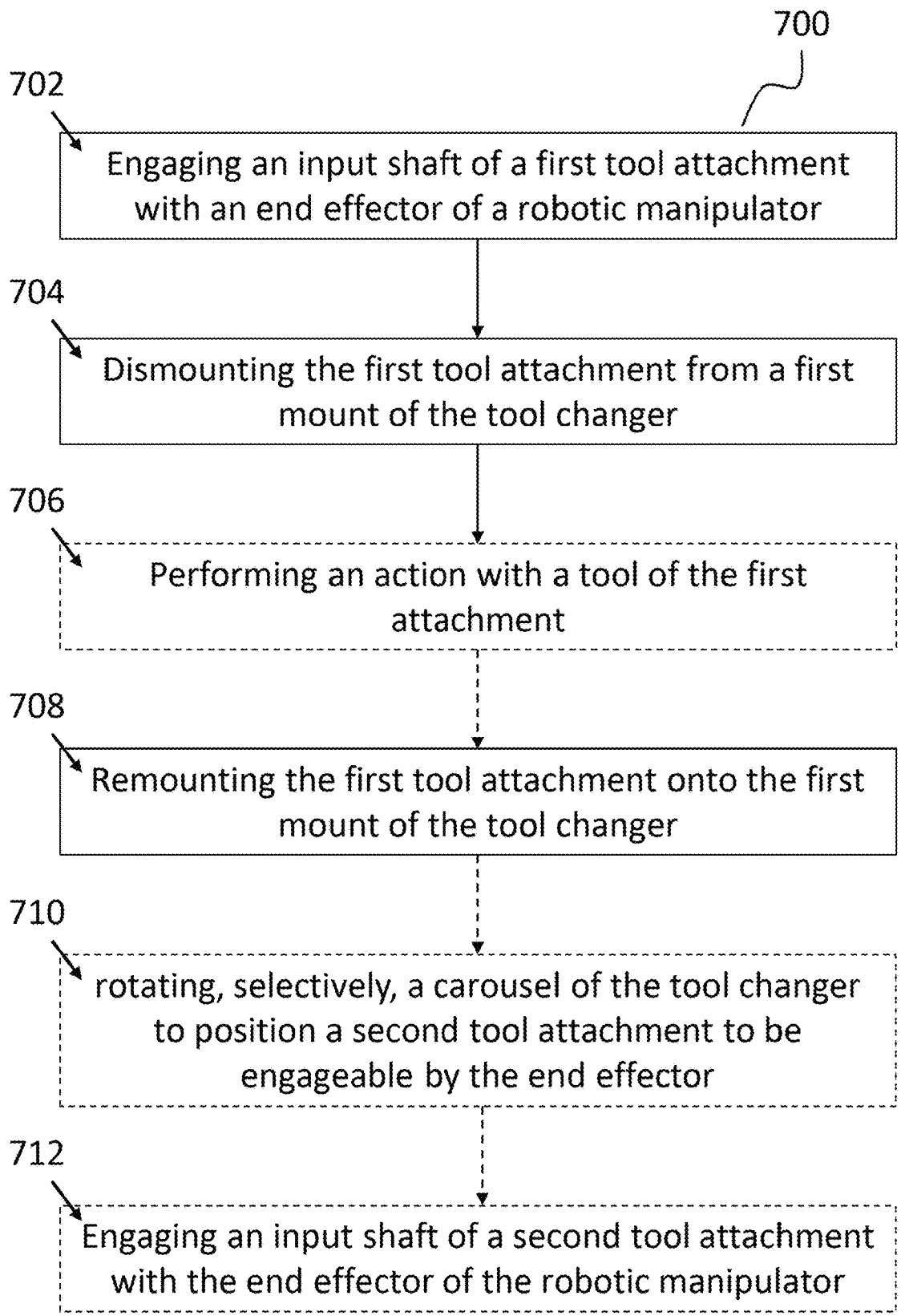
FIG. 7 shows a flow diagram of the operation of selecting a tool from a carousel.

FIG. 7 shows a method of use of a tool changer 500 of the present invention. The end effector 105 of the robotic manipulator 100 engages 702 an input shaft 210 of a first tool attachment 200A. The robotic manipulator 100 then dismounts 704 the first tool attachment 200A from a first mount 504A of a tooling basket 502 of a tool changer 500.

A tool 214A of the first tool attachment 200A may, optionally, be used to perform 706 an action. The first tool attachment 200A is then remounted 708 onto the first mount 504A of the tool changer 500.

Optionally, a carousel of the tool changer 500 is rotated 710 to position a second tool attachment 200B to be engageable by the end effector 105 of the robotic manipulator 100.

Further optionally, the end effector 105 of the robotic manipulator 100 engages 712 an input shaft of a second tool attachment 200B. A tool 214B of the second tool attachment 200B may then be used to perform an action.

The invention claimed is:

1. A tool attachment for a robotic manipulator, comprising:
   a housing configured to engage with the robotic manipulator;
   an input shaft configured to be engaged by an end effector of the robotic manipulator;
   an output shaft coupled to the input shaft; and
   a tool coupled to said output shaft, wherein:
      said housing comprises means for preventing relative rotational movement between said housing and a housing of the robotic manipulator;
      upon engagement of the end effector of the robotic manipulator with the input shaft, the tool attachment is retained on the robotic manipulator, and rotational movement of the end effector of the robotic manipulator acts to rotate said input shaft relative to said housing and drive said tool;
   wherein said housing of the tool attachment comprises a hollow sleeve portion having a first, open, end and a second, closed, end, said tool disposed at said second end, said input shaft being within an interior space of said hollow sleeve portion; and
   wherein said hollow sleeve portion is shaped to form a guide portion at said first, open, end, the guide portion being configured to radially align, relative to a longitudinal axis of said housing of the tool attachment, and guide the robotic manipulator into the interior space of said hollow sleeve portion of said housing of the tool attachment.

2. The tool attachment for the robotic manipulator according to claim 1, wherein said guide portion is frusto-conical.

3. The tool attachment for the robotic manipulator according to claim 1, wherein a rotational axis of said input shaft is substantially aligned with the longitudinal axis of said housing of the tool attachment.

4. The tool attachment for the robotic manipulator according to claim 1, wherein said means for preventing relative rotational movement comprises at least one slot, the slot configured to engage with a corresponding projection on the robotic manipulator or each slot configured to engage with a respective projection on the robotic manipulator.

5. The tool attachment for the robotic manipulator according to claim 1, wherein said input shaft comprises an interface portion configured to be engaged by the end effector of the robotic manipulator.

6. The tool attachment for the robotic manipulator according to claim 5, wherein said interface portion comprises a bar affixed perpendicular to said input shaft to form a T-piece.

7. The tool attachment for the robotic manipulator according to claim 1, wherein the tool is a rotary tool, and wherein the output shaft is coupled to the input shaft by a transmission unit comprising an input coupled to the input shaft and an output coupled to the output shaft, said transmission unit configured such that the rotational speed of the output is higher than the rotational speed of the input, or such that the rotational speed of the output is lower than the rotational speed of the input.

8. The tool attachment for the robotic manipulator according to claim 7, wherein a rotational axis of the transmission unit output is angularly offset from a rotational axis of the transmission unit input.

9. The tool attachment for the robotic manipulator according to claim 7, wherein said rotary tool is a cutting disc.

10. The tool attachment for the robotic manipulator according to claim 1, wherein the tool is a linear tool, and wherein the output shaft is coupled to the input shaft by a linear transmission unit comprising an input coupled to the input shaft and an output coupled to the output shaft, said transmission unit configured such that rotation input shaft causes linear movement of the output shaft.

11. The tool attachment for the robotic manipulator according to claim 10, wherein said linear tool is one of:
a cable cutter;
a gripper comprising three or more jaws; an "orange peel" grabber; and
a sample collector.

12. A tool changer comprising:
a plurality of the tool attachments according to claim 1; and
a tooling basket comprising a plurality of mounts, each mount configured to releasably mount a respective one of the plurality of tool attachments.

13. The tool changer according to claim 12, wherein said tooling basket is configured to be mounted to an unmanned underwater vehicle.

14. The tool changer according to claim 12, wherein said tooling basket comprises a rotatably mounted carousel configured to selectively rotate said plurality of tool attachments to a position in which one of the tool attachments can be engaged by the robotic manipulator.

15. A method of use of a tool changer comprising a plurality of the tool attachments according to claim 1, the method comprising the steps of:
engaging the input shaft of a first tool attachment of the plurality of tool attachments with an end effector of the robotic manipulator;
dismounting the first tool attachment from a first mount of the tool changer; and
remounting the first tool attachment onto the first mount of the tool changer.

16. The method according to claim 15, further comprising the step of:
performing an action with the first tool attachment.

17. The method according to claim 15, further comprising the step of:
engaging the input shaft of a second tool attachment of the plurality of tool attachments with the end effector of the robotic manipulator; and
dismounting the second tool attachment from a second mount of the tool changer.

18. The method according to claim 15, further comprising the step of:
rotating, selectively, a carousel of the tool changer, to position a specific one of the plurality of tool attachments so as to be engageable by the end effector of the robotic manipulator.

19. The tool attachment for the robotic manipulator according to claim 1, wherein said means for preventing relative rotational movement comprises at least one projection, the projection configured to engage with a corresponding slot on the robotic manipulator or each projection configured to engage with a respective slot on the robotic manipulator.

* * * * *